United States Patent
Kagata et al.

(10) Patent No.: US 10,385,226 B2
(45) Date of Patent: Aug. 20, 2019

(54) INK JET INK COMPOSITION AND RECORDING METHOD

(71) Applicant: Seiko Epson Corporation, Tokyo (JP)

(72) Inventors: Takayoshi Kagata, Shiojiri (JP); Hiroshi Fukumoto, Shiojiri (JP); Yasunari Ikeda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/906,276

(22) Filed: Feb. 27, 2018

(65) Prior Publication Data

US 2018/0265723 A1    Sep. 20, 2018

(30) Foreign Application Priority Data

Mar. 16, 2017   (JP) .................. 2017-050786

(51) Int. Cl.
| | |
|---|---|
| *C09D 11/328* | (2014.01) |
| *C09D 11/30* | (2014.01) |
| *B41M 5/00* | (2006.01) |
| *B41M 7/00* | (2006.01) |
| *C09D 11/037* | (2014.01) |
| *C09D 11/102* | (2014.01) |
| *C09D 11/107* | (2014.01) |
| *C09D 11/108* | (2014.01) |

(52) U.S. Cl.
CPC ......... *C09D 11/328* (2013.01); *B41M 5/0023* (2013.01); *B41M 7/009* (2013.01); *C09D 11/037* (2013.01); *C09D 11/102* (2013.01); *C09D 11/107* (2013.01); *C09D 11/108* (2013.01); *C09D 11/30* (2013.01)

(58) Field of Classification Search
CPC ... B41M 5/0023; B41M 7/009; C09D 11/328; C09D 11/102; C09D 11/037; C09D 11/107; C09D 11/30
See application file for complete search history.

(56) References Cited

U.S. PATENT DOCUMENTS

| | | |
|---|---|---|
| 2002/0157569 A1 | 10/2002 | Takemoto et al. |
| 2005/0143490 A1 | 6/2005 | Takemoto et al. |
| 2008/0090964 A1* | 4/2008 | Rajaraman ......... C09D 11/0235 525/100 |
| 2015/0251417 A1 | 9/2015 | Tsubota |
| 2015/0344709 A1 | 12/2015 | Araki |

FOREIGN PATENT DOCUMENTS

| | | |
|---|---|---|
| CN | 102838897 A | 12/2012 |
| CN | 104249579 A | 12/2014 |
| JP | 2003-253166 A | 9/2003 |
| JP | 2015-093956 A | 5/2015 |
| JP | 2016-141686 A | 8/2016 |

OTHER PUBLICATIONS

Extended European Search Report for Patent Application No. EP18162060.0 dated Jun. 27, 2018 (6 pages).

* cited by examiner

*Primary Examiner* — Sharon A. Polk
(74) *Attorney, Agent, or Firm* — Harness, Dickey & Pierce, P.L.C.

(57) ABSTRACT

An ink jet ink composition includes a sublimation dye, a dispersant for the sublimation dye, and polyether siloxane having a weight average molecular weight of 1000 or more and having 5 or more siloxane repeating units.

11 Claims, 1 Drawing Sheet

INK JET INK COMPOSITION AND RECORDING METHOD

BACKGROUND

1. Technical Field

The present invention relates to an ink jet ink composition and a recording method.

2. Related Art

An ink jet recording method is a method in which small droplets of ink are ejected from fine nozzles onto a recording medium for recording. This method allows a high-resolution and high-quality image to be recorded with a relatively low-cost apparatus at a high speed. The ink jet recording method includes many factors to be discussed such as properties of ink to be used, stability in recording, and quality of an obtained image. Various studies have been conducted not only on ink jet recording apparatuses, but also on ink jet ink compositions used in the ink jet recording apparatuses.

The ink jet recording method is used to dye (print) a fabric, for example. As a method of printing a fabric (such as a woven cloth and a non-woven cloth), screen printing and roller printing have been widely employed, for example, but use of an ink jet recording method is now studied from various aspects, because the ink jet recording method is advantageous in, for example, manufacturing of a wide variety of products in small quantities and immediate printing.

For example, JP-A-2016-141686 discloses a textile ink jet ink including a disperse dye dispersed by using resin and a siloxane surfactant.

One mode of textile printing includes a transfer type textile printing method using a sublimation dye. In the textile printing method, an ink jet ink composition is not directly applied onto a print target medium (fabric, for example). The ink jet ink composition is applied onto a transfer medium (paper, for example), which is a transfer source, and then the dye is transferred from the transfer medium to the print target medium for dyeing.

In the transfer textile printing method, a sublimation dye is included in the ink jet ink composition and the ink jet ink composition is applied onto the transfer source medium. Subsequently, the sublimation dye is sublimated by vapor or heat, for example, to dye the print target medium (fabric, for example). The transfer textile printing method is a dry-type (gas-phase) dyeing method. Thus, penetration or bleeding of the ink jet ink composition in the transfer source medium determines quality of an image on the final print target medium. The properties required for the ink jet ink composition used in a sublimation transfer method differ from those required for the ink jet ink composition directly applied onto a fabric for textile printing.

In the ink jet ink described in JP-A-2016-141686, a disperse resin is used to cause a disperse dye to disperse, and a siloxane surfactant is used to maintain stability of system (ink). The siloxane surfactant is considered to be good at lowering surface tension.

Here, the sublimation dye generally has poor dispersion stability compared with the disperse dye, and a dispersant for sublimation dye is used to improve dispersibility. However, it has become clearer that when a certain kind of dispersant is employed and a siloxane surfactant is added thereto, surface activity of the siloxane surfactant changes, which leads to poor storage stability of the ink and more image blur than intended. The study conducted by the inventors has revealed that decomposition of the siloxane surfactant with time contributes to the poor storage stability.

SUMMARY

An advantage of some aspects of the invention is that an ink jet ink composition having high storage stability and less likely to cause blur on an image, and a recording method using the same, are provided.

The invention may be embodied as aspects or examples of application described below.

An ink jet ink composition according to an aspect of the invention includes a sublimation dye, a dispersant for the sublimation dye, and polyether siloxane having a weight average molecular weight of 1000 or more and having 5 or more siloxane repeating units.

The ink jet ink composition according to the aspect has high storage stability and is less likely to cause blur in an image to be produced. In other words, since the polyether siloxane has a weight average molecular weight of 1000 or more and has 5 or more siloxane repeating units, the structure of the polyether siloxane is maintained and high surface activity is kept even if the polyether siloxane is decomposed. Thus, even in the case where the ink jet ink composition is stored for a long time period, the surface tension of the ink jet ink composition is able to be kept low, and thus a high-quality image having high storage stability of ink and having less blur is produced.

In the ink jet ink composition according to the aspect of the invention, the polyether siloxane may have two or more kinds of side chains, and at least one of the side chains may be an alkyl chain.

According to the ink jet ink composition, the polyether siloxane keeps high surface activity with the presence of the alkyl chain if the polyether siloxane has a large weight average molecular weight. Thus, the surface tension is more readily kept low.

In the ink jet ink composition according to the aspect of the invention, the dispersant may be at least one selected from the group consisting of an acrylic resin, a styrene resin, and a urethane resin and may have a weight average molecular weight of 500 or more.

According to the ink jet ink composition, the sublimation dye has higher disperse stability. The use of the resin dispersant having such a large weight average molecular weight is more likely to cause the polyether siloxane to decompose. However, since the polyether siloxane has a weight average molecular weight of 1000 or more and having 5 or more siloxane repeating units, the ink jet ink composition is able to keep high surface activity, and thus high storage stability is maintained and an image to be produced has less blur. The polyether siloxane provides more significant advantages.

In the ink jet ink composition according to the aspect of the invention, a total content of the dispersant may be 1 to 20% by mass inclusive relative to a total amount of the ink jet ink composition.

According to the ink jet ink composition, higher colorant dispersibility is realized.

In the ink jet ink composition according to the aspect of the invention, the ink jet ink composition may have a static surface tension of 35 mN/m or less.

According to the ink jet ink composition, an image is produced to have less blur, and a high-quality image is produced.

In the ink jet ink composition according to the aspect of the invention, an ether chain of the polyether siloxane may be partly separated from a siloxane unit in the ink jet ink composition, and a ratio of the separated ether chain to the polyether siloxane may be 50% or less.

According to the ink jet ink composition, high storage stability is realized.

A recording method according to an aspect of the invention includes applying the above-described ink jet ink composition onto a transfer paper by ejecting the ink jet ink composition from a recording head, and heating the transfer paper after the applying.

According to the recording method, a high-quality recorded product having less blur is produced with the use of the above-described ink jet ink composition. Furthermore, since the above-described ink jet ink composition is used, a high-quality recorded product is produced even if the ink jet ink composition that has been stored for a long time period is used for printing.

The recording method according to the invention may further include heating at least one of the recording head and the transfer paper in the applying.

In such a recording method, even if the ink jet ink composition has higher viscosity, the recording head reliably ejects the ink jet ink composition, and thus a high-quality image is produced.

BRIEF DESCRIPTION OF THE DRAWINGS

The invention will be described with reference to the accompanying drawing.

DESCRIPTION OF EXEMPLARY EMBODIMENTS

Figure 1:
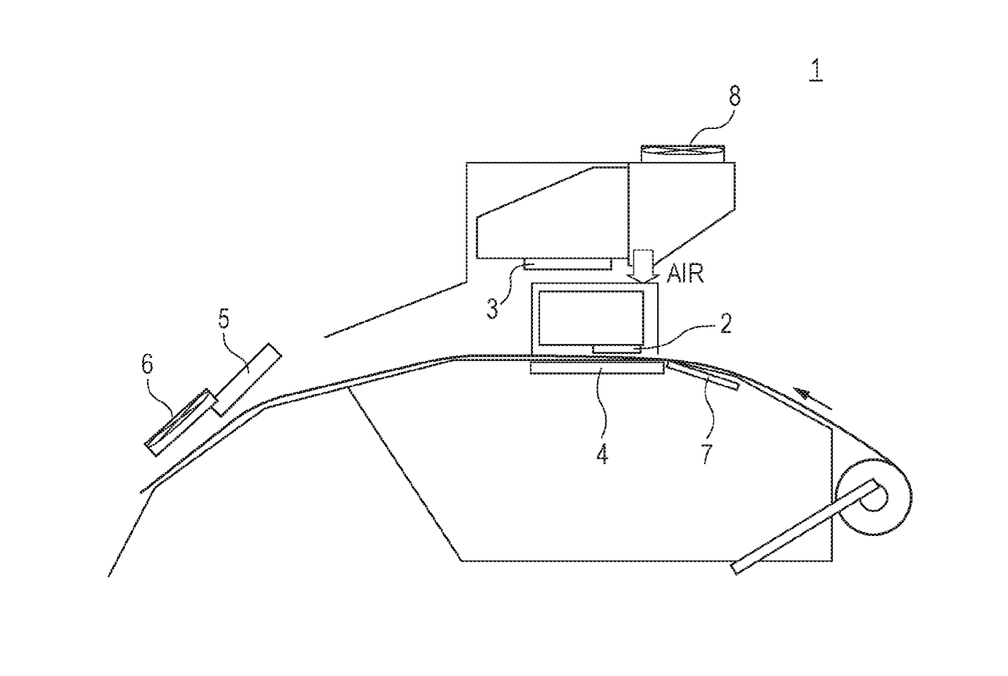
FIGURE is a schematic view schematically illustrating an ink jet recording apparatus according to an embodiment.

Embodiments of the invention are described below. The embodiments described below are examples of the invention. The invention is not limited to the embodiments, and various modifications may be made without departing from the scope of the invention. Not all the configurations described below are essential to the invention.

1. Ink Jet Ink Composition

The ink jet ink composition according to the present embodiment includes a sublimation dye, a dispersant for the sublimation dye, and polyether siloxane having a weight average molecular weight of 1000 or more and having 5 or more siloxane repeating units.

1.1. Sublimation Dye

The ink jet ink composition according to the embodiment includes a sublimation dye. The sublimation dye is a dye suitably used to dye hydrophobic synthetic fibers such as polyester fibers, nylon fibers, and acetate fibers, and is a compound insoluble or scarcely soluble in water. In addition, the sublimation dye is a dye to be sublimated by heating. Examples of the sublimation dye used in the ink jet ink composition of the embodiment include, but are not particularly limited to, the following dyes.

As the sublimation dye, a disperse dye or a solvent dye, for example, having the above-described properties, may be used. Specific examples of the dye include C.I. Disperse Yellow 3, 7, 8, 23, 39, 51, 54, 60, 71, and 86, C.I. Disperse Orange 1, 1:1, 5, 20, 25, 25:1, 33, 56, and 76, C.I. Disperse Brown 2, C.I. Disperse Red 11, 50, 53, 55, 55:1, 59, 60, 65, 70, 75, 93, 146, 158, 190, 190:1, 207, 239, and 240, C.I. Vat Red 41, C.I. Disperse Violet 8, 17, 23, 27, 28, 29, 36, and 57, C.I. Disperse Blue 19, 26, 26:1, 35, 55, 56, 58, 64, 64:1, 72, 72:1, 81, 81:1, 91, 95, 108, 131, 141, 145, and 359, and C.I. Solvent Blue 36, 63, 105, and 111. These dyes may be used either alone or in combination.

Among the above-listed dyes, the ink jet ink composition according to the embodiment may preferably include C.I. Disperse Yellow 3, 7, 8, 23, 51, 54, 60, 71, or 86, C.I. Disperse Orange 20, 25, 25:1, 56, or 76, C.I. Disperse Brown 2, C.I. Disperse Red 11, 53, 55, 55:1, 59, 60, 65, 70, 75, 146, 190, 190:1, 207, 239, or 240, C.I. Vat Red 41, C.I. Disperse Violet 8, 17, 23, 27, 28, 29, 36, or 57, C.I. Disperse Blue 26, 26:1, 55, 56, 58, 64, 64:1, 72, 72:1, 81, 81:1, 91, 95, 108, 131, 141, 145, or 359, or C.I. Solvent Blue 36, 63, 105, or 111, for example, in order to provide the ink jet ink composition with higher storage stability.

Although the above-listed sublimation dyes are compounds insoluble or scarcely soluble in water, the sublimation dye contained without exceeding a predetermined concentration range is able to be reliably dispersed in water by using a dispersant, which will be described below. The above-listed sublimation dyes are slightly different in dispersibility and solubility from each other. In other words, a preferable concentration range of the dispersant and the solubility by the dispersant vary depending on the kind of the sublimation dye.

The sublimation dyes may be used either alone or in combination as a mixed color dye.

The total content of the sublimation dye is 10% by mass or less, preferably 0.1 to 10% by mass inclusive, more preferably 0.2 to 9.0% by mass inclusive, and further more preferably 0.3 to 8.0% by mass inclusive, relative to 100% by mass of the ink jet ink composition.

The content of the disperse dye of 0.1% or more is likely to allow the dyed product (transfer target) to have higher color development properties (OD value). The content of the sublimation dye of 10% by mass or less is likely to improve the ejection properties.

1.2. Dispersant

The ink jet ink composition according to the embodiment includes a dispersant for the sublimation dye. The dispersant causes the above-described sublimation dye to disperse in the ink jet ink composition. Examples of the dispersant include, but not particularly limited to, an anionic dispersant, a nonionic dispersant, and a polymer dispersant (a resin dispersant).

Examples of the anionic dispersant may preferably include a formalin condensate of an aromatic sulfonic acid. Examples of the "aromatic sulfonic acid" in the formalin condensate of an aromatic sulfonic acid may include creosote oil sulfonic acid, cresolsulfonic acid, phenolsulfonic acid, β-naphtholsulfonic acid, alkylnaphthalenesulfonic acids such as methylnaphthalenesulfonic acid and butylnaphthalene sulfonic acid, a mixture of β-naphthalenesulfonic acid and β-naphtholsulfonic acid, a mixture of cresol sulfonic acid and 2-naphthol-6-sulfonic acid, ligninsulfonic acid, and the salts thereof.

Furthermore, examples of the anionic dispersants preferably include a β-naphthalenesulfonic acid-formalin condensate, an alkylnaphthalenesulfonic acid-formalin condensate, a creosote oil sulfonic acid-formalin condensate, and the salts thereof, and more preferably include sodium salts thereof.

Examples of the nonionic dispersants include an ethylene oxide adduct of a phytosterol and an ethylene oxide adduct of a cholestenol.

Examples of a commercially available product of naphthalenesulfonic acid based dispersant include Demol NL: naphthalenesulfonic acid, Demol MS, Demol N, Demol RN, Demol RN-L, Demol SC-30, Demol SN-B, Demol SS-L, Demol T, and Demol T-45, which are manufactured by Kao Corporation.

Examples of the polymer dispersant (also referred to as a "resin dispersant") include an acrylic resin such as polyacrylic acid, an acrylic acid-acrylonitrile copolymer, an acrylic acid-acrylic acid ester copolymer, a vinyl acetate-acrylic acid ester copolymer, a vinyl acetate-acrylic acid copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, and a vinylnaphthalene-acrylic acid copolymer, the salts thereof, a styrene resin such as a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, and a styrene-anhydrous maleic acid copolymer, the salts thereof, a urethane resin with or without a crosslinked structure, which is a linear and/or branched polymer compound (resin) having a urethane bond obtained by reaction of an isocyanate group and a hydroxyl group, the salts thereof, polyvinyl alcohols, the salts thereof, polyvinyl pyrrolidones, the salts thereof, a vinyl naphthalene-maleic acid copolymer, the salts thereof, a vinyl acetate-maleate ester copolymer, the salts thereof, a vinyl acetate-crotonic acid copolymer, and the salts thereof.

Examples of commercially available products of the styrene resin dispersant include X-200, X-1, X-205, and X-220 (manufactured by SEIKO PMC CORPORATION), for example. Examples of commercially available products of the acrylic resin dispersant include BYK-190, BYK-187, BYK-191, BYK-194N, and BYK-199 (manufactured by BYK Japan K.K), for example. Examples of commercially available products of the urethane resin dispersant include BYK-184, BYK-182, BYK-183, and BYK-185 (manufactured by BYK Japan K.K), for example.

The dispersants may be used either alone or in combination. The total content of the dispersant is 0.1 to 30% by mass inclusive, preferably 0.5 to 25% by mass inclusive, more preferably 1 to 20% by mass inclusive, and further more preferably 1.5 to 15% by mass inclusive, relative to 100% by mass of the ink jet ink composition. The dispersant content of 0.1% by mass or more causes the sublimation dye to stably disperse. In addition, the dispersant content of 30% by mass or less does not cause the sublimation dye to dissolve too much and allows the viscosity to be kept low.

Among the above-listed dispersants, a resin dispersant is preferably employed. In particular, at least one selected from the group consisting of an acrylic resin, a styrene resin, and a urethane resin is preferably employed. In this case, it is further preferable that the dispersant have a weight average molecular weight of 500 or more. The use of such a resin dispersant as the dispersant causes the sublimation dye to more stably disperse.

The study conducted by the inventors revealed that the resin dispersant is likely to induce a reaction in which a polyether chain of polyether siloxane is separated from a siloxane chain when the resin dispersant is present in a composition together with the polyether siloxane. Even when the resin dispersant having such a property is used, the employment of polyether siloxane (described later) having a weight average molecular weight of 1000 or more and having 5 or more siloxane repeating units allows the ink jet ink composition to reliably keep high surface tension, and thus an image to be produced is likely to have less blur.

In other words, even if the resin dispersant, which is not advantageous to polyether siloxane, is used to improve dispersibility of the sublimation dye, a high-quality image is able to be obtained. Thus, employment of the polyether siloxane described below is advantageous.

1.3. Polyether Siloxane

The ink jet ink composition according to the embodiment includes polyether siloxane having a weight average molecular weight of 1000 or more and having 5 or more siloxane repeating units. The skeleton of the polyether siloxane is represented by the following formula (I), for example.

In the formula (I), R represents an alkyl group.

In the formula (I), x represents a natural number, y, z, m, and n each represent an integer of 0 or more, and x+y equals an integer of 4 or more (x+y≥4), which means 5 or more siloxane repeating units. The siloxane repeating unit (one of the above "—Si—O—" chains) may present in any order and in a random or block form. Thus, the x and y units may be mixed.

Furthermore, in the formula (I), EO represents an ethyleneoxy group, PO represents a propyleneoxy group, and m and n each represent an integer of 0 or more. In addition, m+n equals an integer of 1 or more, and EO and PO may present in any order and in a random or block form in the tortoise shell brackets.

In the formula (I), R may be any alkyl group, and the carbon number thereof may be 1 to 20 inclusive, preferably 1 to 16 inclusive, more preferably 2 to 8 inclusive.

In the formula (I), when y is not 0 (y 1), the compound of the formula (I) has two or more kinds of side chains. In this case, if R is an alkyl chain having two or more carbons, the polyether siloxane has an alkyl chain as at least one of the side chains. Such a polyether siloxane has higher surface activity due to the presence of the alkyl chain even if the polyether siloxane has a large weight average molecular weight, and thus the use of the polyether siloxane is more likely to allow the ink jet ink composition to keep the surface tension low.

In the formula (I), when y is 0, the polyether siloxane does not have an alkyl chain as a side chain. However, even such polyether siloxane has sufficient surface activity, and is likely to allow the ink jet ink composition to keep the surface tension low.

The weight average molecular weight of the polyether siloxane is determined by Gel Permeation Chromatography (GPC), for example, in terms of polystyrene, using a solution containing polyether siloxane dissolved in an appropriate solvent. The ink jet ink composition according to the embodiment includes polyether siloxane having a weight average molecular weight of 1000 or more, but may also include polyether siloxane having a weight average molecular weight of less than 1000.

The weight average molecular weight of the polyether siloxane is 1000 or more, preferably 1200 or more, preferably 1500 or more, and further more preferably 2000 or more. The polyether siloxane having the weight average molecular weight of 1000 or more is able to exhibit sufficient surface activity if decomposition of the polyether siloxane is caused by the dispersant, for example. Thus, the surface tension of the ink jet ink composition is able to be kept low for a long time period.

The weight average molecular weight of the polyether siloxane varies depending on the length of the polyether chain and/or the number of siloxane repeating units. The inventors assume that the weight average molecular weight of the polyether siloxane mainly depends on the polyether chain. Thus, the weight average molecular weight of the polyether siloxane is efficiently adjusted by changing the length of the polyether chain and the number thereof (the value of the above-described x). The number of the repeating units of siloxane may be determined by nuclear magnetic resonance (NMR), for example.

Here, decomposition of the polyether siloxane is described. The inventors have revealed that the polyether siloxane is gradually decomposed when added to the ink jet ink composition. In the decomposition, mainly, the polyether chain is separated from the main chain, when chains of the repeating units of siloxane of the polyether siloxane form the main chain. In the decomposition of the polyether siloxane, all the polyether chains may be separated from the polyether siloxane, but it has been revealed that some of the polyether chains are separated.

Thus, molecules generated by the decomposition mainly include molecules resulting from some or all of the polyether chains being separated from the original polyether siloxane and the separated polyether molecules. In any ink jet ink composition immediately after the production or after long storage, for example 30 days at 60° C., the mass ratio (B/A) between the separated polyether molecules (B) and the original polyether siloxane molecules (A) is 60% or less, preferably 50% or less, and more preferably 40% or less. The mass ratio in such ranges allows the ink jet ink composition to reliably keep the surface tension sufficiently low.

The inventors have revealed that the decomposition of the polyether siloxane is more likely to occur when the dispersant for the sublimation dye is a resin dispersant. The mechanism has not been fully revealed, but contact between the resin dispersant and the chains of the siloxane is likely to cause the separation of the polyether.

When the number of the siloxane repeating units is large and x in the above formula (I) is large, the number of polyether chains remaining in the chain of the siloxane is large even if the polyether chain is separated, and thus the surface activity of the polyether siloxane is unlikely to be inhibited. This allows the ink jet ink composition to keep the surface tension in a preferable range. In other words, when the dispersant for the sublimation dye is the resin dispersant, the polyether siloxane having a weight average molecular weight of 1000 or more, and having 5 or more, preferably 10 or more, and more preferably 20 or more siloxane repeating units more reliably allows the surface tension of the ink jet ink composition to be in a preferable range.

Examples of the polyether siloxane having a weight average molecular weight of 1000 or more and having 5 or more siloxane repeating units include BYK-378 and BYK-331 (all are manufactured by BYK Japan K.K).

1.4. Other Components
1.4.1. Water Soluble Organic Solvent

The ink jet ink composition according to the embodiment may include water soluble organic solvent. Inclusion of the water soluble organic solvent improves the moisture retaining property of the ink jet ink composition, making the ejection stability of the ink jet method high and effectively reducing water evaporation from a recording head that has been unattended for a long time period. In addition, this allows recovery property or continuous ejection stability to be kept high even if a dye that may readily cause clogging of nozzles is used. Examples of the water soluble organic solvent includes an alkyl polyol, a nitrogen-containing cyclic compound, and a glycol ether.

Examples of the alkyl polyol include 1,2-butanediol [194° C.], 1-2-pentandediol [210° C.], 1,2-hexanediol [224° C.], 1,2-heptanediol [227° C.], 1,3-propanediol [210° C.], 1,3-butanediol [230° C.], 1,4-butanediol [230° C.], 1,5-pentandediol [242° C.], 1,6-hexanediol [250° C.], 2-ethyl-2-methyl-1,3-propanediol [226° C.], 2-methyl-2-propyl-1,3-propandiol [230° C.], 2-methyl-1,3-propandiol [214° C.], 2,2-dimethyl-1,3-propandiol [210° C.], 3-methyl-1,3-butanediol [203° C.], 2-ethyl-1,3-hexanediol [244° C.], 3-methyl-1,5-pentandediol [250° C.], 2-methylpentane-2,4-diol [197° C.], diethylene glycol [245° C.], dipropylene glycol [232° C.], triethylene glycol [287° C.], and glycerin [290° C.]. The numerical values in brackets are normal boiling points. The alkyl polyols may be used either alone or in combination.

Examples of the nitrogen-containing heterocyclic compound include lactams such as ε-caprolactam [136° C.]. Examples of the water soluble organic solvent include lactones such as γ-butyrolactone [204° C.] and a betaine compound. Furthermore, a glycol ether may be included. The inclusion enables control of wettability and penetration rate in some cases.

Examples of the glycol ether preferably include a monoalkyl ether of glycol selected from the group consisting of ethylene glycol, diethylene glycol, triethylene glycol, polyethylene glycol, propylene glycol, dipropylene glycol, tripropylene glycol, polypropylene glycol, and polyoxyethylene polyoxypropylene glycol. More preferably, examples thereof include methyl triglycol (triethylene glycol monomethyl ether), butyltriglycol (triethylene glycol monobutyl ether), butyldiglycol (diethylene glycol monobutyl ether), and didpropylene glycol monopropyl ether. A typical example thereof includes diethylene glycol monobutyl ether [230° C.]. Numerical values in brackets are normal boiling points.

The water soluble organic solvent may be a mixture of some kinds of water soluble organic solvents. The content of the water soluble organic solvent described herein is 0.2 to 30% by mass inclusive, preferably 0.4 to 20% by mass inclusive, more preferably 0.5 to 15% by mass inclusive, and further more preferably 0.7 to 10% by mass inclusive, relative to the total amount of the ink jet ink composition from the viewpoint of adjustment of viscosity of the ink jet ink composition and prevention, by moisturizing effect, of clogging.

1.4.2. Surfactant

The ink jet ink composition according to the embodiment may include a surfactant in addition to the above-described polyether siloxane having a weight average molecular weight of 1000 or more and having 5 or more siloxane repeating units. The surfactant is used to lower the surface tension of the ink jet ink composition to adjust and improve wettability relative to the recording medium (penetration properties relative to a fabric or the like). The surfactant may be any one of a nonionic surfactant, an anionic surfactant, a cationic surfactant, and an amphoteric surfactant, or may be any combination thereof. Preferable examples of the surfactants include an acetylene glycol-based surfactant, a silicone-based surfactant, and a fluorine-based surfactant.

Examples of the acetylene glycol-based surfactant include, but are not particularly limited to, Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names, manufactured by Air Products and Chemicals, Inc.), Olfine B, Y, P, A, STG, SPC, E1004, E1010, PD-001, PD-002W, PD-003, PD-004, PD-005, EXP.4001, EXP.4036, EXP.4051, AF-103, AF-104, AK-02, SK-14, and AE-3 (all are trade names, manufactured by Nissin Chemical Industry Co., Ltd.), and Acetylenol E00, E00P, E40, and E100 (all are trade names, manufactured by Kawaken Fine Chemicals Co., Ltd.).

Examples of the silicone surfactant include, but are not particularly limited to, a polysiloxane compound. Examples of the polysiloxane compound include, but are not particularly limited to, a polyether-modified organosiloxane. Examples of commercially available products of the polyether-modified organosiloxane include BYK-306, BYK-307, BYK-333, BYK-341, BYK-345, BYK-346, BYK-348, and BYK-349 (trade names, manufactured by BYK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

The fluorine-based surfactant is preferably a fluorine-modified polymer, and examples thereof include BYK-340 (manufactured by BYK Japan K.K).

When a surfactant is contained in the ink jet ink composition, the content of the total surfactant, other than the polyether siloxane compound discussed above, is preferably 0.01 to 3% by mass inclusive, preferably 0.05 to 2% by mass inclusive, more preferably 0.1 to 1.5% by mass inclusive, and particularly preferably 0.2 to 1% by mass inclusive, relative to the total of the ink composition.

The inclusion of the surfactant in the ink jet ink composition is likely to improve ejection stability of ink ejected from the ink head. The employment of the surfactant in a proper amount improves penetration properties of the ink jet ink composition relative to a fabric and increases contact with a pretreatment composition in some cases.

1.4.3. pH Adjuster

The ink jet ink composition according to this embodiment may include a pH adjuster to adjust pH. Examples of the pH adjuster include, but are not particularly limited to, any combination of acids, bases, weak acids, and weak bases. Examples of acids and bases used for the combination include, inorganic acids such as a sulfuric acid, a hydrochloric acid, and a nitric acid, inorganic bases such as lithium hydroxide, sodium hydroxide, potassium hydroxide, potassium dihydrogen phosphate, sodium dihydrogen phosphate, potassium carbonate, sodium carbonate, sodium hydrogen carbonate, and ammonia, organic bases such as triethanolamine, diethanolamine, monoethanolamine, tripropanolamine, triisopropanolamine, diisopropanolamine, and tris(hydroxymethyl)aminomethane (THAM), organic acids such as adipic acid, citric acid, succinic acid, lactic acid, Good's buffers such as N, N-bis(2-hydroxyethyl)-2-aminoethanesulfonic acid (BES), 4-(2-hydroxyethyl)-1-piperazineethanesulfonic acid (HEPES), morpholinoethanesulfonic acid (MES), (carbamoylmethyl)iminobisacetic acid (ADA), piperazine-1,4-bis(2-ethanesulfonic acid) (PIPES), N-(2-acetamido)-2-aminoethanesulfonic acid (ACES), cholamine chloride, N-[tris(hydroxymethyl)methyl]-2-aminoethanesulfonic acid (TES), acetamidoglycine, tricine, glicinamied, and bicine, a phosphate buffer solution, a citrate buffer solution, and a tris buffer solution. Among the above components, it is preferable to include, as a part or all of the pH adjuster, a tertiary amine such as triethanolamine and triisopropanolamine and a carboxyl group-containing organic acid such as adipic acid, citric acid, succinic acid, and lactic acid to stably obtain pH buffering effect.

1.4.4. Water

The ink jet ink composition according to the embodiment may include water. Examples of water include pure water, such as ion exchanged water, ultrafiltrated water, reverse osmosis water, and distilled water and water from which ionic impurities are removed as much as possible, such as ultrapure water. Employment of water sterilized by application of ultraviolet light or hydrogen peroxide prevents bacteria and fungi during long-time storage of the ink jet ink composition.

The content of water is preferably 30% by mass or more, preferably 40% by mass or more, more preferably 45% by mass or more, and further more preferably 50% by mass or more, relative to the total amount of the ink jet ink composition. The water in the ink jet ink composition may include a colorant dispersing liquid and water added as a basic ingredient, for example. The water content of 30% by mass or more allows the ink jet ink composition to have relatively low viscosity. The upper limit of the water content is preferably 90% by mass or less, more preferably 85% by mass or less, and further more preferably 80% by mass or less, relative to the total amount of the ink jet ink composition.

1.4.5. Ureas

Urea may be included as a moisturizer of the ink jet ink composition or as a dyeing aid for improving dyeing properties. Examples of ureas include, but are not limited to, urea, ethyl urea, tetramethylurea, thiourea, and 1,3-dimethyl-2-imidazolidinone. When urea is contained, the content thereof is preferably 1 to 10% by mass inclusive relative to the total mass of the ink composition.

1.4.6. Saccharides

Saccharides may be included to suppress solidification and drying of the ink jet ink composition. Examples of saccharides include glucose, mannose, fructose, ribose, xylose, arabinose, galactose, aldonic acid, glucitol (sorbit), maltose, cellobiose, lactose, sucrose, trehalose, and maltotriose.

1.4.7. Chelating Agent

A chelating agent may be included to remove unnecessary ions from the ink jet ink composition. Examples of the chelating agent include ethylenediaminetetraacetic acid and the salts thereof (such as ethylenediaminetetraacetic acid dihydrogen disodium salt, ethylene diamine nitrilotriacetate, hexametaphosphate, pyrophosphate, and metaphosphate).

1.4.8. Antiseptics and Fungicides

The ink jet ink composition may include an antiseptic or a fungicide. Examples of the antiseptic and the fungicide include sodium benzoate, sodium pentachlorophenol, 2-pyridinethiol-1-oxide sodium, sodium sorbate, sodium dehydroacetate, 1,2-benzisothiazolin-3-one (such as Proxel CRL, Proxel BDN, Proxel GXL, Proxel XL. 2, Proxel TN, and Proxel LV manufactured by Zeneca), and 4-Chloro-3-methylphenol (such as Preventol CMK available from Bayer AG).

1.4.9. Others

Furthermore, additives other than the above-described components, such as an anticorrosive agent, an antioxidant, a UV absorber, an oxygen absorber, and a solubilizing agent, which are typically used in an ink jet ink composition, may be included.

1.5. Production and Properties of Ink Composition

The above-described components are mixed in an appropriate order and filtered as necessary to remove impurities to produce the ink composition according to the embodiment. The mixing of the components may preferably be performed by adding the components into a container provided with a stirrer, such as a mechanical stirrer and a magnetic stirrer, in sequence so as to be stirred and mixed therein.

The ink composition according to the embodiment preferably has the surface tension at 20° C. of 20 to 40 mN/m, more preferably 25 to 38 mN/m, and further more preferably 35 mN/m or less, to achieve a balance between the printing quality and reliability as an ink for ink jet textile printing. The surface tension may be determined by determining the surface tension on a platinum plate wetted by the ink composition under 20° C. environment by using an automatic surface tensiometer CBVP-Z (manufactured by Kyowa Interface Science Co., Ltd.).

From the same viewpoint, the viscosity of the ink composition at 20° C. is preferably 1.5 to 10 mPa·s, and more preferably 2 to 8 mPa·s. The surface tension and the viscosity are able to be in the above-described ranges by suitably adjusting the kind of the water soluble organic solvent, the kind of the surfactant, the amount of the water soluble organic solvent, the amount of the surfactant, and the addition amount of water. The viscosity may be determined by determining the viscosity at the shear rate of 200 while the shear rate is increased from 10 to 1000 at 20° C. environment by using a viscoelasticity measuring apparatus MCR-300 (manufactured by Physica).

In the ink jet ink composition according to the embodiment, pH is 5.8 to 10.5 inclusive, preferably 6.0 to 10.0 inclusive, more preferably 6.0 to 9.5 inclusive, and further more preferably 7.0 to 8.5 inclusive. The pH of the ink jet ink composition within the above-described ranges leads to an improvement in the storage stability of the sublimation dye in the inkjet ink composition, and thus color development properties and hue of the image to be obtained is unlikely to change. The colors of a predetermined design are reliably reproduced.

1.6. Effects

The ink jet ink composition according to the embodiment has high storage stability and is less likely to cause blur on an image to be produced. In other words, the polyether siloxane having a weight average molecular weight of 1000 or more and having 5 or more siloxane repeating units allows the structure of the polyether siloxane to remain and maintains high surface activity even if the polyether siloxane is decomposed. Thus, the ink jet ink composition stored for a long time period is able to maintain the surface tension low, and thus high storage stability is obtained and an image having less blur is produced.

2. Recording Method

The above-described ink jet ink composition is suitably applied in a method (sublimation transfer ink jet recording method) of dyeing a fabric or the like using sublimation transfer. The recording method according to the embodiment may be referred to as a method of producing a recorded transfer source and/or a method of producing a dyed product (dyed fabric).

In one example of the dyeing method using sublimation transfer, ink jet printing is performed on a sheet-like intermediate transfer medium (transfer paper, for example), such as paper, by using an ink composition containing the sublimation dye, and then the intermediate transfer medium is placed on a transfer paper, such as a fabric, for sublimation transfer by heating. The recording method according to the embodiment at least includes an application step of applying an ink jet ink composition onto a transfer paper by ejecting the ink composition from the recording head and a first heating step of heating the transfer paper after the application step.

2.1. Application Step

In this step, an ink jet ink composition is ejected from the recording head onto a recording surface of an intermediate transfer medium (transfer paper) by using an ink jet method. The ejection of the ink composition by using the ink jet method may be performed by a liquid droplet ejector (such as an ink jet recording apparatus, which is described below).

Examples of the intermediate transfer medium (transfer paper) include paper, such as plain paper, and a recording medium provided with an ink receiving layer (referred to as an ink jet paper or coated paper, for example). It is preferable that paper provided with an ink receiving layer including inorganic particulates, such as silica particulates, be used as the intermediate transfer medium. This allows an intermediate recorded product to have less blur, for example, on the recording surface, because the ink composition applied onto the intermediate medium is dried. In addition, such a medium allows the sublimation dye to readily remain on the recording surface, allowing the sublimation dye to efficiently sublimate in the following transfer step. In this step, multiple kinds of ink jet ink compositions described above may be used.

2.2. Heating Step

The recording method according to the embodiment includes a first heating step of heating the transfer paper after the application step. In the first heating step, the ink jet ink composition ejected onto the transfer paper (intermediate recording medium) is heated. The first heating step accelerates drying of the ink jet ink composition, which has been applied in the application step, and thus less image blur and less set-off occur in some cases. The set-off means transfer of the components of the ink jet ink composition from the recording surface to a rear surface of the transfer paper when the transfer paper is overlapped by being taken up by a roll, for example.

In the first heating step, the temperature of the transfer paper reaches preferably 60° C. or more, more preferably 70° C. or more and 120° C. or less, and further more preferably 70° C. or more and 110° C. or less. The temperatures in such ranges do not allow the sublimation dye to readily sublimate and provide suitable drying speed.

2.3. Other Steps

The recording method according to the embodiment may include a second heating step of heating at least one of the recording head and the transfer paper in the application step. In addition, the recording method according to the embodiment may include placing a fabric on the recording surface of the transfer paper and heating the transfer paper and the fabric.

In the second heating step, the recording head may be warmed with radiant heat, for example. The ink jet ink composition according to the embodiment is unlikely to cause nozzle clogging even if the recording head is warmed, and thus the ejection stability is maintained. The heating temperature during ejection of the ink jet ink composition is preferably 30 to 60° C., and more preferably 40 to 60° C., for example.

In the second heating step, the transfer paper may be heated. In this case, the ink jet ink composition is applied to the warmed transfer paper, and thus the ink jet ink composition is dried soon after the application. This further reduces the possibility that image blur and set-off will occur. The surface temperature of the transfer paper is preferably 30° C. to 60° C., more preferably 35° C. to 50° C., and further more preferably 35° C. to 45° C., for example.

The recording method according to the embodiment may include heating the recording surface of the intermediate transfer medium (transfer paper) onto which the ink jet ink composition has been applied while facing the dye target (fabric or the like) (while the fabric or the like is placed on the recording surface of the transfer paper) such that the sublimation dye in the ink jet ink composition is transferred to the dye target. This provides a dyed product obtained by dyeing a dye target such as a fabric.

The heating temperature in the transfer step is not particularly limited, and may be 160° C. to 220° C. inclusive, and more preferably 170° C. to 200° C. inclusive. The heating temperatures in the above ranges provide enough energy for transferring the sublimation dye to the dye target, leading to high productivity of the dyed product.

The heating duration in the transfer step is 30 to 90 seconds inclusive, and more preferably 45 to 60 seconds inclusive, depending on the heating temperature. This provides enough energy for transferring the sublimation dye to the dye target, leading to high productivity of the dyed product.

In the transfer step, the intermediate transfer medium onto which the ink jet ink composition has been applied is heated while facing the dye target. However, it is more preferable that the intermediate transfer medium and the dye target be heated while being in close contact with each other. This allows a more vivid image to be recorded (dyed) on a fabric or the like.

For example, a sheet-like object such as a fabric (e.g., hydrophobic fiber fabric), or a resin (plastic) film, is suitably used as the dye target, but an object having a solid shape such as a spherical shape or a rectangular parallelepiped shape other than the sheet-like shape may be used as the dye target.

The dye target may be formed of glass, metal, or ceramic, other than a resin and a plastic. Examples of the fibers that may be used as the material for forming a fabric as a dye target include synthetic fibers such as polyester fibers, nylon fibers, triacetate fibers, diacetate fibers, polyamide fibers, and a mixture of two or more kinds of the fibers. Alternatively, a mixture of such fibers and regenerated fibers, such as rayon, or natural fibers, such as cotton, silk, and wool may also be used.

Examples of the resin (plastic) film that may be used as the dye target include a polyester film, a polyurethane film, a polycarbonate film, a polyphenylene sulfide film, a polyimide film, and a polyamide-imide film. The resin (plastic) film may be a laminate in which a plurality of layers are stacked, or may be formed of a gradient material that gradually changes in composition.

The above-described recoding method, which employs the ink jet ink composition according to the embodiment, causes less blur on the transfer paper and exhibits high drying properties. Thus, transfer paper is readily formed that allows a design to be reproduced with less blur when the dyed product is produced by transferring the sublimation dye to a fabric, for example.

2.4. Configuration of Apparatus Used in Recording Method

The ink jet ink composition according to the embodiment is suitably used in an ink jet recording apparatus. The ink jet recording apparatus may have any configuration at least including an ink container (a cartridge, or a tank, for example) configured to store the ink jet ink composition and a recording head connected to the ink container. The ink jet recording apparatus is not particularly limited as long as the ink jet recording apparatus is configured to eject the above-described ink composition from the recording head such that an image is formed on an intermediate transfer medium (transfer paper, for example).

The ink jet recording apparatus may be a serial inkjet recording apparatus or a line inkjet recording apparatus. The inkjet recording apparatus of such a type is provided with a recording head. A predetermined volume (mass) of liquid droplets of ink jet ink composition is ejected through nozzle holes of the recording head at a predetermined timing (intermittently) while the relative positional relationship between the transfer paper and the recording head is changed such that the ink jet ink composition is applied onto the transfer paper to form a predetermined image.

In general, in the serial ink jet recording apparatus, a transport direction of the recording medium and a reciprocating direction of the recording head intersect each other, and the relative positional relationship between the recording medium and the recording head changes according to the combination of the reciprocating movement of the recording head and the transport movement (including reciprocating movement) of the recording medium. In this case, the recording head generally includes a plurality of nozzle holes (through which the ink composition is ejected), and a line of the nozzle holes (nozzle line) extends in the transport direction of the recording medium. The recording head includes a plurality of nozzle lines in some cases depending on a kind of the ink composition or the number of the ink compositions.

Furthermore, in general, in the line ink jet recording apparatus, the recording head is not reciprocated, and the recording medium is moved to change the relative positional relationship between the recording medium and the recording head. Also in this case, the recording head typically includes a plurality of nozzle holes, and a line of the nozzle holes (nozzle line) extends in the transport direction of the recording medium.

In the ink jet recording method, a serial or line ink jet recording apparatus is used, but the method may be any method that allows an ink composition in a form of liquid droplets to be ejected through fine nozzle holes onto a recording medium. Examples of the liquid droplet ejection method (ink jet method) include a piezo method, and a method that ejects an ink by utilizing bubbles produced by heating the ink, for example. It is preferable to use a piezo method that rarely changes properties of the ink composition.

The ink jet recording apparatus used in the above-described embodiment may include any known component such as a heating unit, a drying unit, a roll unit, and a take-up device without limitations.

Hereinafter, an example of a recording apparatus suitably employed for a recording method of the embodiment is described. FIGURE is a schematic sectional view of an ink jet recording apparatus according to an embodiment. As illustrated in FIGURE, a recording apparatus 1 includes a recording head 2, an IR heater 3, a platen heater 4, an after heater 5, a cooling fan 6, a preheater 7, and a ventilation fan 8.

The recording head 2 is configured to eject an ink jet ink composition onto transfer paper. The recording head 2 may employ any known type. Examples of the known type include a recording head configured to eject liquid droplets using vibration of a piezoelectric device i.e., a recording head configured to form ink droplets by using mechanical deformation of an electrostriction device. The recording head 2 may be configured to eject ink dots of the jet ink composition in multiple sizes through one nozzle.

In the recording apparatus 1, the first heating step of heating the transfer paper after the application step is able to be performed by the after heater 5. Although not illustrated, other mechanisms such as a hot air mechanism (not illustrated) and a constant temperature bath (not illustrated) may be used. The after heater 5 is configured to heat and dry the transfer paper onto which the ink jet ink composition has been applied. The moisture or the like in the ink jet ink composition is quickly evaporated when the after heater 5 heats the transfer paper on which an image has been recorded. Thus, blur or the like is less likely to be formed. The after heater 5 is configured to heat the transfer paper to preferably 70° C. or more, and more preferably to 70° C. or more and 110° C. or less.

In the recording apparatus 1, the above-described second heating step of heating at least one of the recording head and the transfer paper is able to be performed by the IR heater 3, which directly heats the recording head 2, or the platen heater 4, which heats the transfer paper or the recording head 2 through the transfer paper.

The IR heater 3 may heat the transfer paper from the side of the recording head 2. In such a case, the recording head 2 may also be heated at the same time, but the transfer paper is heated without being affected by the thickness of the transfer paper, compared with a case in which the transfer paper is heated from the rear side by using the platen heater 4, for example. The platen heater 4 may heat the transfer paper from the side away from the recording head 2. In such a case, the recording head 2 is less likely to be heated.

The recording apparatus 1 preferably further includes a transfer paper heater configured to heat the transfer paper when the ink jet ink composition is ejected onto the transfer paper such that the transfer paper has a surface temperature of about 30 to about 60° C. The surface temperature is more preferably 35 to 50° C., and further more preferably 35 to 45° C. Examples of the transfer paper heater include, but are not limited to, the IR heater 3 and the platen heater 4. The employment of the transfer paper heater enables the ink composition applied onto the transfer paper to quickly dry, and thus image blur is further less likely to occur.

The above-described "heat the transfer paper" means that the temperature of the transfer paper is raised to a predetermined temperature, and the transfer paper is not necessarily directly heated. The recording apparatus 1 may include the cooling fan 6. A coating may be formed on the transfer paper in a closed contact state when the ink composition on the transfer paper is cooled by the cooling fan 6 after being dried.

The recording apparatus 1 may include the preheater 7 configured to heat the transfer paper in advance (preheat) before the ink composition is ejected onto the transfer paper. Furthermore, the recording apparatus 1 may include the ventilation fan 8 configured to efficiently dry the ink composition applied onto the transfer paper.

2.5. Effects

The recording method of the embodiment employs the above-described ink jet ink composition, and thus a good recorded product having less blur and less set-off is produced. Furthermore, the employment of the above-described ink jet ink composition enables a good recorded object to be produced even by using an ink jet ink composition that has been stored.

3. Examples and Comparative Examples

Hereinafter, the invention is described in more details by using examples, but the invention is not limited to the examples.

3.1. Preparation of Ink Jet Ink Composition

Components were put into a container to obtain compositions in Table 1, and each mixture was mixed and stirred with a magnetic stirrer for 2 hours and filtered through a membrane filter having a pore size of 5 μm to prepare first inks and second inks (ink jet ink compositions) according to examples and comparative examples. The first ink and the second ink used in each example are the same in composition except for the dye (sublimation dye). The unit of the numerical values in Table 1 is % by mass.

TABLE 1

| | % by mass | Examples | | | | | | | Comparative Examples | | |
|---|---|---|---|---|---|---|---|---|---|---|---|
| | | 1 | 2 | 3 | 4 | 5 | 6 | 7 | 1 | 2 | 3 |
| | First Ink | R1 | R2 | R3 | R4 | R5 | R6 | R7 | R8 | R9 | R10 |
| Sublimation Dye | DR60 | 5 | 5 | 5 | 5 | 5 | 5 | 5 | 5 | 5 | 5 |
| Dispersant | Resin A (Styrene Based) | 1 | 5 | 10 | — | — | 5 | — | 5 | 5 | — |
| | Resin B (Acrylic Based) | — | — | — | 5 | — | — | — | — | — | — |
| | Resin C (Urethane Based) | — | — | — | — | 5 | — | — | — | — | — |
| | Demol NL | — | — | — | — | — | — | 5 | — | — | — |
| Organic Solvent | Propylene Glycol | 5 | 5 | 5 | 5 | 5 | 5 | 5 | 5 | 5 | 5 |
| | Glycerin | 10 | 10 | 10 | 10 | 10 | 10 | 10 | 10 | 10 | 10 |
| | Methyl Triglycol | 5 | 5 | 5 | 5 | 5 | 5 | 5 | 5 | 5 | 5 |
| Polyether Siloxane | BYK378 | 0.5 | 0.5 | 0.5 | 0.5 | 0.5 | — | 0.5 | — | — | 0.5 |
| | BYK331 | — | — | — | — | — | 0.5 | — | — | — | — |
| | BYK348 | — | — | — | — | — | — | — | 0.5 | — | — |
| | BYK349 | — | — | — | — | — | — | — | — | 0.5 | — |
| Water | Pure Water | 73.5 | 69.5 | 64.5 | 69.5 | 69.5 | 69.5 | 69.5 | 69.5 | 69.5 | 74.5 |
| | Initial Surface Tension | 23.2 | 23.8 | 24.0 | 23.5 | 22.5 | 29.0 | 22.6 | 24.0 | 23.8 | 23.1 |
| | Second Ink | B1 | B2 | B3 | B4 | B5 | B6 | B7 | B8 | B9 | B10 |
| Sublimation Dye | DB359 | 5 | 5 | 5 | 5 | 5 | 5 | 5 | 5 | 5 | 5 |

TABLE 1-continued

|  | % by mass | Examples |  |  |  |  |  |  | Comparative Examples |  |  |
|---|---|---|---|---|---|---|---|---|---|---|---|
|  |  | 1 | 2 | 3 | 4 | 5 | 6 | 7 | 1 | 2 | 3 |
| Dispersant | Resin A (Styrene Based) | 1 | 5 | 10 | — | — | 5 | — | 5 | 5 | — |
|  | Resin B (Acrylic Based) | — | — | — | 5 | — | — | — | — | — | — |
|  | Resin C (Urethane Based) | — | — | — | — | 5 | — | — | — | — | — |
|  | Demol NL | — | — | — | — | — | — | 5 | — | — | — |
| Organic | Propylene Glycol | 5 | 5 | 5 | 5 | 5 | 5 | 5 | 5 | 5 | 5 |
| Solvent | Glycerin | 10 | 10 | 10 | 10 | 10 | 10 | 10 | 10 | 10 | 10 |
|  | Methyl Triglycol | 5 | 5 | 5 | 5 | 5 | 5 | 5 | 5 | 5 | 5 |
| Polyether | BYK378 | 0.5 | 0.5 | 0.5 | 0.5 | 0.5 | — | 0.5 | — | — | 0.5 |
| Siloxane | BYK331 | — | — | — | — | — | 0.5 | — | — | — | — |
|  | BYK348 | — | — | — | — | — | — | — | 0.5 | — | — |
|  | BYK349 | — | — | — | — | — | — | — | — | 0.5 | — |
| Water | Pure Water | 73.5 | 69.5 | 64.5 | 69.5 | 69.5 | 69.5 | 69.5 | 69.5 | 69.5 | 74.5 |
|  | Initial Surface Tension | 23.8 | 24.2 | 24.5 | 23.8 | 22.6 | 29.5 | 23.6 | 24.6 | 24.4 | 24.2 |
| Evaluation | Storage Stability (Viscosity) | A | A | B | B | A | A | A | A | A | C |
| Results | Blur with Time | A | A | A | B | A | B | A | C | C | B |
|  | Decomposition Rate 30 days at 60° C. | A | A | A | A | A | B | A | C | C | B |
|  | Set-off | A | A | B | A | A | B | A | B | A | A |
|  | Initial Blur | A | A | A | A | A | B | A | A | A | B |

The components in Table 1 other than the components in compound names are as follows.

Demol NL: naphthalenesulfonic acid, manufactured by Kao Corporation

Resin A (styrene-based): X-200 manufactured by SEIKO PMC CORPORATION

Resin B (acrylic-based): BYK190 manufactured by BYK Japan K.K

Resin C (urethane-based): BYK184 manufactured by BYK Japan K.K

BYK378: polyether siloxane having a weight average molecular weight of 1000 or more and having 5 or more siloxane repeating units BYK331: polyether siloxane having a weight average molecular weight of 1000 or more and having 5 or more siloxane repeating units BYK348: polyether siloxane having a weight average molecular weight of less than 1000

BYK349: polyether siloxane having a weight average molecular weight of less than 1000

3.2. Evaluation Methods 3.2.1. Initial Surface Tension

The surface tension (initial surface tension) at 25° C. of each ink immediately after the production was determined by using an automatic tensiometer DY-300 manufactured by Kyowa Interface Science Co., Ltd., and the results thereof are shown in Table 1. In Table 1, a unit of initial tension is mN/m.

3.2.2. Storage Stability of Ink

A change in viscosity with time was examined and evaluated for each ink. Each ink was kept undisturbed for one week at 70° C. The initial viscosity and the viscosity after being kept undisturbed for one week were determined, and each ink was evaluated based on the following criteria. The results thereof are shown in Table 1. The first ink and the second ink in each example showed similar behavior in the storage stability. Thus, the results of the first and second inks in each example are shown in one column.

A: a change in viscosity was within ±5% or less

B: a change in viscosity was more than ±5% and ±10% or less

C: a change in viscosity was ±10% or more 3.2.2 Blur with Time

The inks in each example were left undisturbed for 30 days at 60° C. Subsequently, the ink jet printer (trade name PX-G930, manufactured by Seiko Epson Corporation) was loaded with a set of two inks (the first ink and the second ink) in each example, and recording was performed on a printing medium (transfer paper) (TRANSJET Sportsline produced by Cham Paper). Specifically, a solid pattern was printed with 100% duty at a resolution of horizontal 720 dpi×vertical 720 dpi and used for evaluation. The solid pattern of the first ink and that of the second ink were printed next to each other on the transfer paper, and blur at the boundary was visually checked and evaluated based on the following evaluation criteria. The evaluations were all performed in a laboratory at a room temperature (25° C.). The evaluations were made based on the following criteria, and the results are shown in Table 1.

Here, duty is a numerical value calculated by using an equation of duty (%)=(the number of recording dots per square inch/resolution (720×720))×100.

A: no blur was observed at the boundary

B: a little blur was observed at the boundary

C: a lot of blur was observed at the boundary 3.2.3. Decomposition Rate

The inks left undisturbed for 30 days at 60° C. and the inks immediately after production were measured using NMR to determine the decomposition amount (decomposition rate) of polyether siloxane. The decomposition rate is defined by using a mass ratio (B/A) between separated polyether molecules (B) and original polyether siloxane molecules (A). Then, evaluations were made based on the following criteria, and the results thereof are shown in Table 1.

A: decomposition rate of 25% or less

B: decomposition rate of 25% or more and 50% or less

C: decomposition rate of 50% or more 3.2.4. Set-Off

The same solid pattern as the solid pattern printed for the evaluation of blur with time was printed. Then, an unused transfer paper, which is the same as the transfer paper, was placed on the printed object 10 seconds after the printing, and the printed object was left undisturbed for 10 minutes with a load of 500 g being applied thereto. The unused transfer paper was visually checked after being left undisturbed to know if color transfer occurred. Evaluations were made based on the following criteria, and the results thereof are shown in Table 1.

A: no set-off was observed

B: a little color transfer was observed

C: a lot of color transfer was observed 3.2.5. Initial Blur

Initial blur was evaluated in the same way as the blur with time, except that inks immediately after preparation (within three hours) were used, and evaluations were made in the same manner as the evaluations of blur with time, and the results are shown in Table 1.

3.3. Evaluation Results

The examples that employ the ink set (the first ink and the second ink) including polyether siloxane having a weight average molecular weight of 1000 or more and having 5 or more siloxane repeating units showed good results in every evaluation.

Compared to the above, the comparative examples 1 and 2, which employ the ink set (the first ink and the second ink) including no polyether siloxane having a weight average molecular weight of 1000 or more and having 5 or more siloxane repeating units showed poor results in the blur with time. In the comparative examples 1 and 2, the decomposition rate was high. This seemingly accelerated decomposition of the polyether siloxane and increased the surface tension of the ink. In addition, in the comparative example 3, which includes no dispersant for the sublimation dye, the storage stability was poor. This was seemingly caused by aggregation of dye with time.

The invention is not limited to the above-described embodiments, and various modifications may be added thereto. For example, the invention may include various other configurations that are substantially the same as the configurations described in the above-described embodiment (e.g., a configuration having the same function, method, and results, or a configuration having the same objective and results). The invention also may include a configuration in which an unessential part described in the above-described embodiments is replaced with something else or omitted. The invention may also include a configuration providing the same effects or capable of achieving the same objective as those in the configuration described in the above-described embodiment. The invention may further include a configuration in which a known technique is added to the configurations described in the above-described embodiments.

The entire disclosure of Japanese Patent Application No. 2017-050786, filed Mar. 16, 2017 is expressly incorporated by reference herein.

What is claimed is:

1. An ink jet ink composition comprising:
   a sublimation dye;
   a dispersant for the sublimation dye; and
   polyether siloxane having a weight average molecular weight of 1000 or more and having 5 or more siloxane repeating units,
   wherein upon decomposition of the polyether siloxane in the ink jet ink composition, an ether chain of the polyether siloxane is partly separated from a siloxane unit, and a ratio of the separated ether chain to the polyether siloxane is 50% or less.

2. The ink jet ink composition according to claim 1, wherein
   the polyether siloxane has two or more kinds of side chains, and
   at least one of the side chains is an alkyl chain.

3. A recording method comprising:
   applying the ink jet ink composition according to claim 2 onto a transfer paper by ejecting the ink jet ink composition from a recording head; and
   heating the transfer paper after the applying.

4. The ink jet ink composition according to claim 1, wherein
   the dispersant is at least one selected from the group consisting of an acrylic resin, a styrene resin, and a urethane resin and has a weight average molecular weight of 500 or more.

5. A recording method comprising:
   applying the ink jet ink composition according to claim 4 onto a transfer paper by ejecting the ink jet ink composition from a recording head; and
   heating the transfer paper after the applying.

6. The ink jet ink composition according to claim 1, wherein
   a total content of the dispersant is 1 to 20% by mass inclusive relative to a total amount of the ink jet ink composition.

7. A recording method comprising:
   applying the ink jet ink composition according to claim 6 onto a transfer paper by ejecting the ink jet ink composition from a recording head; and
   heating the transfer paper after the applying.

8. The ink jet ink composition according to claim 1, wherein
   the ink jet ink composition has a static surface tension of 35 mN/m or less.

9. A recording method comprising:
   applying the ink jet ink composition according to claim 8 onto a transfer paper by ejecting the ink jet ink composition from a recording head; and
   heating the transfer paper after the applying.

10. A recording method comprising:
    applying ink jet ink composition according to claim 1 onto a transfer paper by ejecting the ink jet ink composition from a recording head; and
    heating the transfer paper after the applying.

11. The recording method according to claim 10, further comprising heating at least one of the recording head and the transfer paper in the applying.

* * * * *